UNITED STATES PATENT OFFICE.

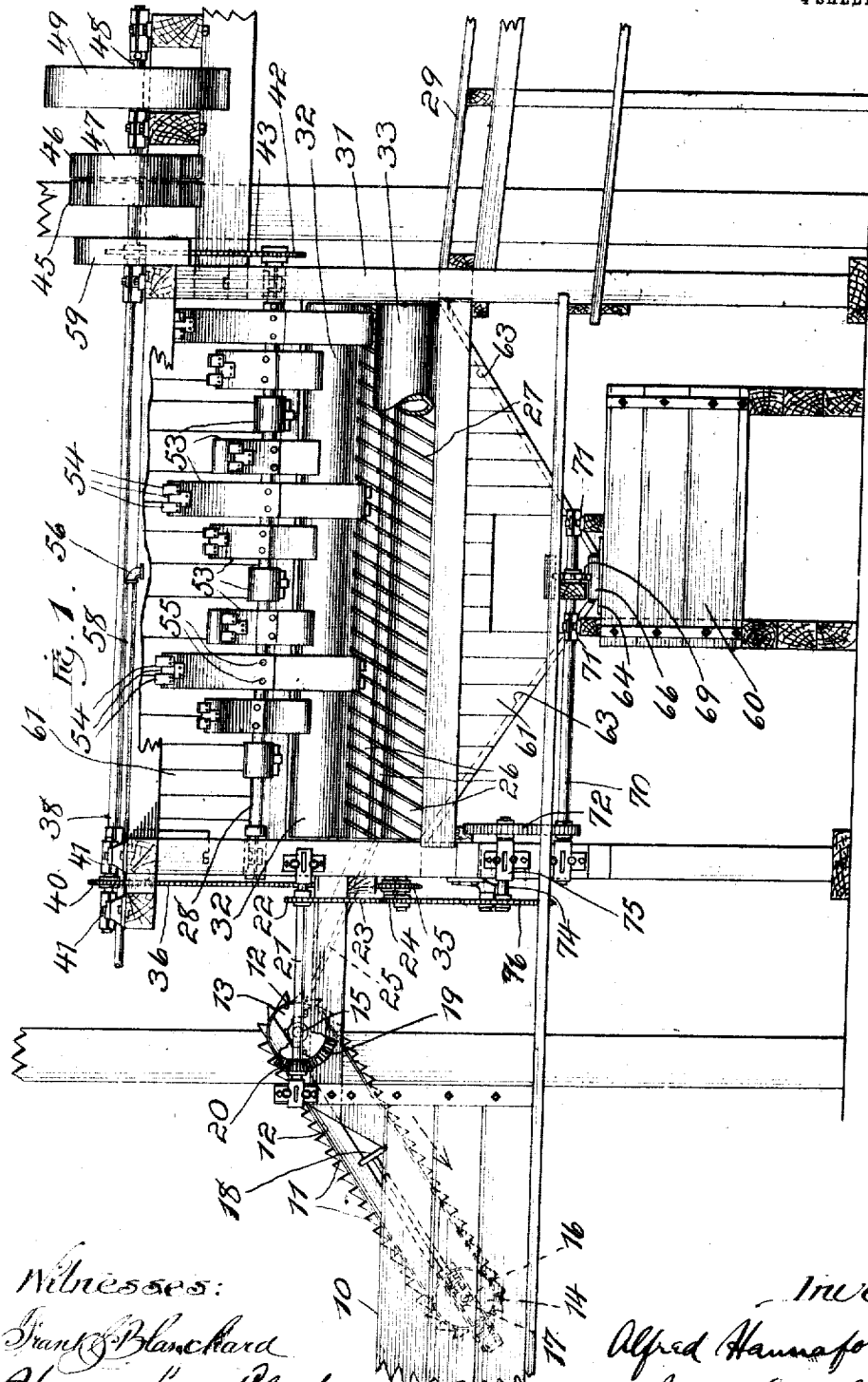

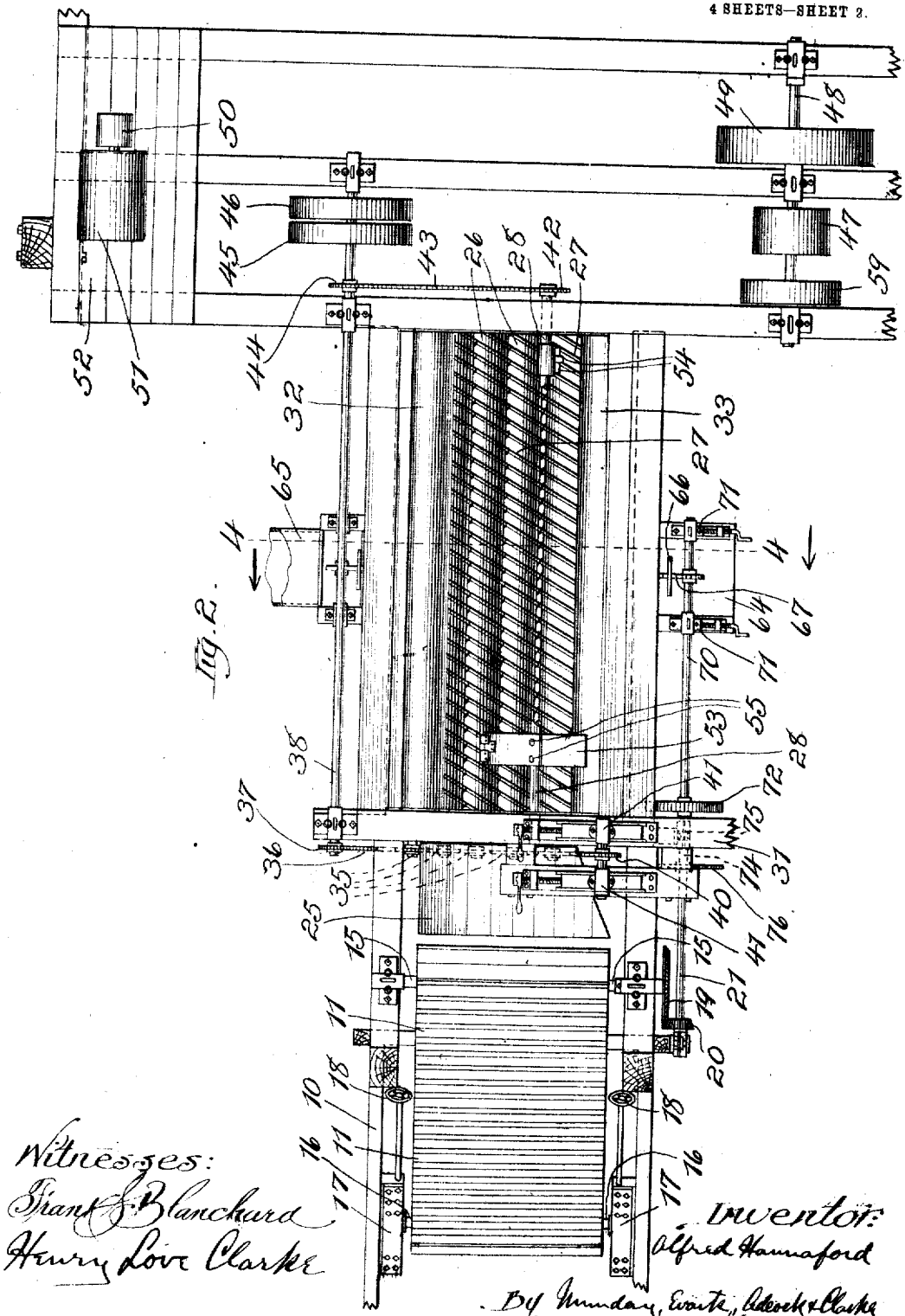

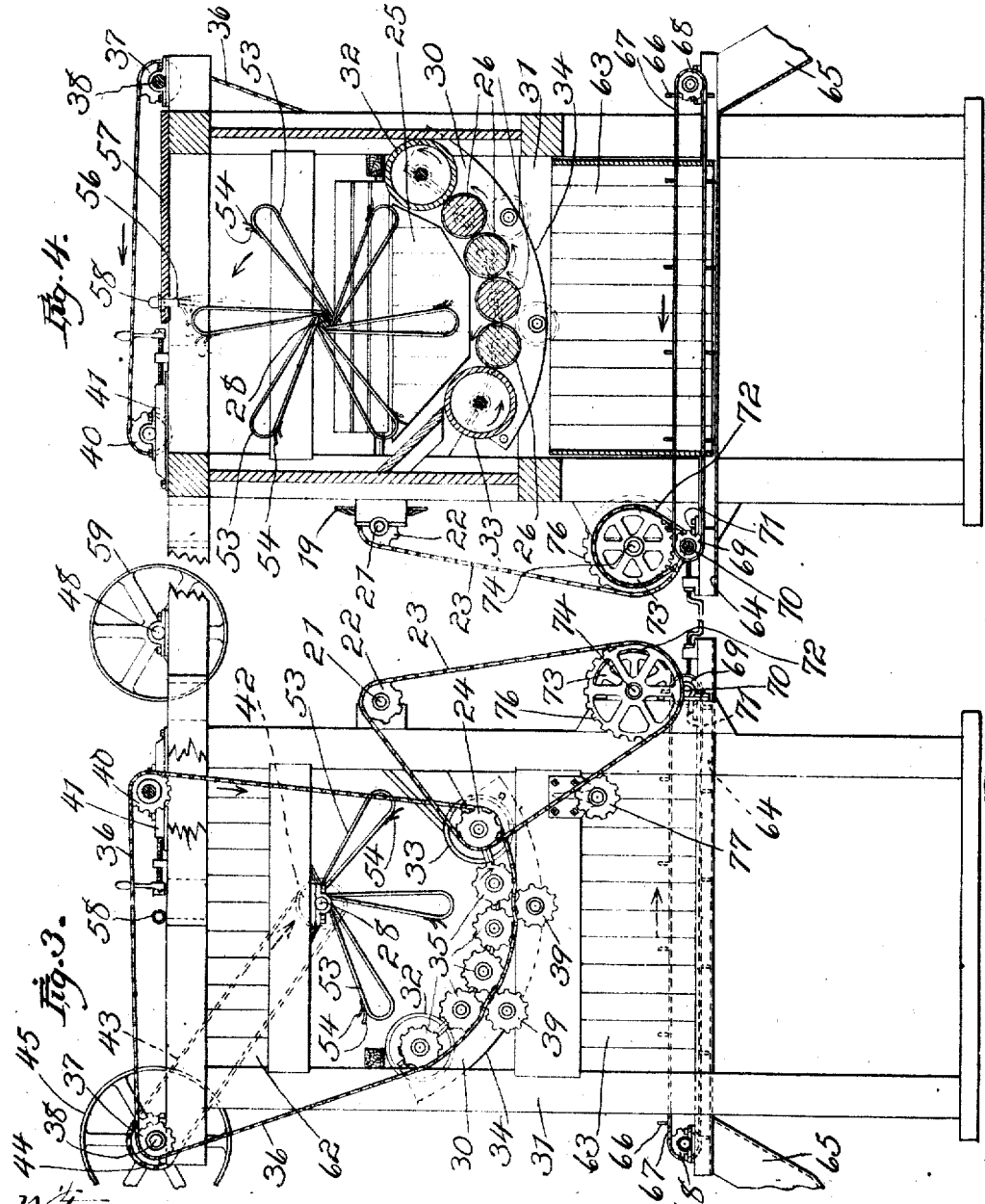

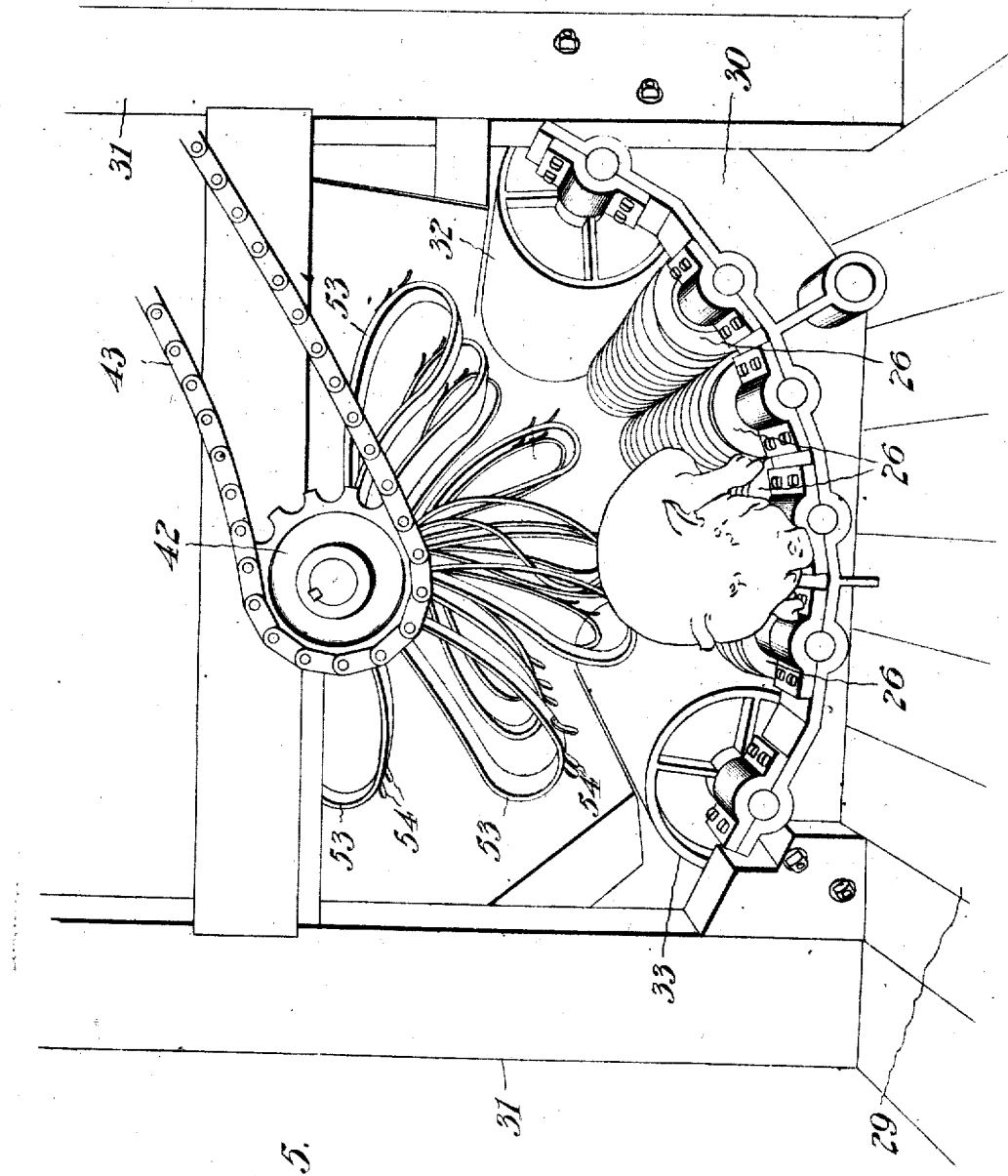

ALFRED HANNAFORD, OF CHICAGO, ILLINOIS.

CARCASS-DEHAIRING MECHANISM.

1,016,495.      Specification of Letters Patent.      Patented Feb. 6, 1912.

Application filed May 13, 1909. Serial No. 495,595.

*To all whom it may concern:*

Be it known that I, ALFRED HANNAFORD, a citizen of the United States, residing in Chicago, in the county of Cook and State of Illinois, have invented a new and useful Improvement in Carcass-Dehairing Mechanism, of which the following is a specification.

My invention relates to power-operated mechanism for dehairing and polishing the carcasses of slaughtered hogs, or other slaughtered animals; and the invention provides a machine, for such purpose, of high efficiency and extreme compactness and simplicity of construction and positiveness of operation, and has for further objects such other novel improvements in structure or function as may be found to obtain in the device hereinafter described or claimed.

In the accompanying drawings, forming a part of this specification, and in which like reference numerals indicate like parts in all of the figures:—Figure 1 is a vertical longitudinal sectional view through the machine; Fig. 2 is a top plan view; Fig. 3 is an end view at the left-hand end of the scraper and polisher mechanism shown in Figs. 1 and 2; Fig. 4 is a transverse vertical sectional view taken on the line 4—4 of Fig. 2; and Fig. 5 is an enlarged perspective view into the forward end of the machine, showing the dehaired carcass of the hog as it is being discharged onto the gambreling bench.

10 is the scalding-tub, filled with super-heated water, into which the carcasses of the slaughtered hogs are first conveyed and floated. When sufficiently scalded to properly loosen the hair and bristles, the carcass is floated to and engaged and lifted by the continuously running endless conveyer whose lower end is immersed in the scalding tub, such conveyer being formed of a series of transverse wedge-shaped wooden slats 11, 11 mounted at their opposite ends on the links of the endless sprocket-chains 12 that travel on the sprockets 13 and 14, the sprockets 13 being mounted on the driven upper cross-shaft 15, and the sprockets 14 being mounted on the lower cross-shaft 16 that is journaled in the adjustable bearings 17, 17 adjusted by the hand-wheels 18, 18 to vary the tension of the endless conveyer. The driven cross-shaft 15 is driven by the meshing of the bevel-gear 19, on its right end, with the bevel pinion 20 on the rear end of the short horizontal drive-shaft 21 whose other end is provided with a sprocket 22 engaged by an endless sprocket-chain 23 that passes over and is driven by the smaller sprocket 24 on the extreme rear end of the axle of one of the carcass-conveyer rollers of the scraper mechanism, continuously in motion. As the carcass is lifted, preferably snout first, over the high point of the endless slat-conveyor, it is chuted down the smooth inclined chute 25, onto the rear ends of the gang of horizontal spirally-ribbed conveyer-rollers 26, 26, which are severally in constant rotation in such direction that their spiral ribbing 27 will engage and carry forward the carcass, passing it under the entire length of the beater-shaft 28 and discharging it on the inclined gambreling-bench 29. The carcass conveyed through the beater-mechanism is freely supported on these conveyer-rollers, without being grappled to them, the carcass being free of any grappling to the means that advance it. The conveyer-rollers are mutually parallel, and also parallel to and have their axes at equal radial distances from the axis of the beater-shaft 28, and their ends are journaled in the segment-formed castings 30 that are stationarily secured in the framework 31 of the scraper mechanism. These castings 30 also journal the two somewhat larger and smooth-faced conveyer-rollers 32, 33, disposed respectively above and below and paralleling the gang of spiral conveyers 26 and having their axes at the same radial distance from the axis of the beater-shaft. The peripheral face 34 of each journal-casting 30 has its curvature struck from the axis of the beater-shaft as a center, so that these castings may be conveniently adjusted and secured in the proper angular relation to the beater-shaft, the positioning that is most effective being substantially that shown most clearly in Figs. 3 and 4, with the highest of the gang of conveyer-rollers well forward, in the angular direction of the beater-shaft's rotation, of a vertical plane projected downward from the length of the axis of the beater-shaft. The conveyer-rollers have their rear ends severally provided with the sprockets 35 engaged and driven by the endless sprocket-chain 36 that passes over and is continuously driven by the sprocket-pinion 37 on the rear end of the drive-shaft 38 that is mounted on one edge of the top of the framework 31. The idle sprockets 39, 39, mounted on the adjacent journal-casting 30, hold the sprocket-chain 36 to its working engagement with the sprockets 35; and the accessory sprocket 40, journaled in the adjustable bearings 41, 41 at the top of the framework 31, serves to adjustably tension said sprocket-chain 36 and to hold it clear of the path of travel of the carcasses entering the beater mechanism. The forward end of the beater-shaft 28 has secured upon it the sprocket 42 that is engaged and continuously driven by the endless sprocket-chain 43 that passes over and is driven by the sprocket 44 secured near the forward end of the long drive-shaft 38; and the rotation thus imparted to the beater-shaft 28 is in the same direction as the simultaneous rotations of the several conveyer-rollers. The fixed and loose pulleys 45, 46 are mounted on the forward end of said drive-shaft 38 and belted to the drum 47 secured on the power-shaft 48 whose fixed pulley 49 is belted to the motor-shaft pulley 50 of the motor 51 mounted on the platform 52.

Along the entire length of the beater-shaft 28, within the ends of the framework 31, there are fixed successive pairs of diametrically opposed loop beaters 53, the successive pairs being spirally disposed around the shaft, with the successive beaters advanced an angular distance of one-sixth of a circumference, so that each three successive pairs complete a cycle of the spiral and the entire set of beaters are so distributed as to radiate, in equal numbers, in six equi-spaced directions from the rotating shaft that carries them. Each beater 53 consists in a loop of heavy but flexible belting, with three mutually-staggered and forwardly-curved dull-edged metallic scrapers 54 riveted on the forward face of such loop close to its recurved apex. The two ends of each loop 53 are brought together and both secured in a tangential position on the same side of the beater-shaft, the thus disposed ends of each pair of diametrically opposed beaters being secured on diametrically opposite sides of the shaft, by means of bolts 55 passing through the beater-ends and the shaft, the forward face of the forward end of each beater being in immediate tangential contact with the shaft.

As the carcass traverses the length of the gang of conveyer-rollers, it is rolled over and over by the conjoint action of the rotation of said rollers and the sweep of the beaters, as the beater-shaft rotates in the same angular direction with the rollers. And the gang of conveyer rollers are so positioned that as the sweep of the beaters tends to roll the carcass upward, in the direction of such sweep, the rotation of the rollers will tend to roll the carcass downward, against the sweep of the beaters, and so preserve it, during its travel through the beater mechanism, substantially under the beater shaft or somewhat lifted toward the side in the direction of the sweep of the beaters. The slip of the rolling carcass across the edges of the spiral ribs of the ribbed rollers, as it is rolled and advanced along such rollers, serves to scrape off a considerable part of the hair from such carcass, the ribs thus acting as scrapers auxiliary to the scrapers on the beaters. The smooth rollers on either side of the gang of spirally ribbed conveyer rollers tend to check the carcass from rolling either too far upward, in the direction of the sweep of the beaters, or too far in the reverse direction. The travel of the carcasses through the beater mechanism is exceedingly rapid,— as high as a couple of hundred per hour or even more. The beaters themselves, formed of loops of flexible belting with dull-edged scraper blades on their forward faces, yield and conform to the contour of the carcass as they sweep over it, and yet are sufficiently elastic to spring back into normal position, with their apices sweeping in close proximity to the conveyer-rollers. The loop form peculiarly aids and maintains their efficiency and flexible elasticity. While long use renders them more yielding, this fact is found an advantage, for they may readily be replaced and renewed and if so renewed at the beginning of what is termed the "hard hair" period, the cold season at which the hair and bristles cling most tenaciously to the hides of the carcasses, the beaters will be stiffest, and beat the carcasses most rigorously, at such period, and then, under continued use, will have become more yielding, and so less violent in their action, when the "soft hair" or warm season arrives. The recurved apex of the loop of each beater gives a rolling action to the sweep of the beater as it passes over and clears itself from contact with the carcass, and this feature of the functioning gives a further efficiency to the beater action as the beaters are centrifugally thrown against and swept over the turning carcass.

While the carcass is passing through the beater mechanism, it is constantly sprayed with scalding water, to facilitate the scraping and polishing. The spraying is produced by the beaters striking a constant stream of scalding water issuing from the spray-head 56 located at the middle of the roof 57 of the beater compartment, such spray-head being fed through a feed-pipe 58 leading to a pump that is belted to the pulley 59 on the power-shaft 48 and that draws water from the drain-trough 60 located under the beater-mechanism, the water in such trough being kept at scalding temperature by the use of live steam, as is also the water in the scalding-tub 10. The spray showered over the carcass is confined by the side-walls 61 and end-walls 62 of the beater-mechanism framework, and the spray-water, carrying with it the removed hair and bristles and other detritus drains off between the conveyer-rollers and is directed down the drain inclines 63, 63 to the drain-apertured top-plate 64 on the drain-water trough 60. The hair and bristles and other detritus thus deposited on the said plate 64 at the foot of inclines 63, 63 are constantly swept off of said plate, and into the waste-chute 65, by the transverse paddles 66, 66 peripherally mounted on the endless sprocket-chain 67 that is stretched across the entire width of the drain discharge space at the foot of the inclines 63, 63. One end of said endless chain 67 passes over the sprocket 68 and the other end is engaged and driven by the sprocket 69 fixed on the shaft 70 that is journaled in the bearings 71, 71, adjustable to tension said chain, and that has secured on its rear end a small sprocket driven by the sprocket-chain 72 passing over the large sprocket 73 on the forward end of the short shaft 74 that is mounted in the bearing 75 and has secured on its rear end the large sprocket 76 that is engaged and constantly driven by the same sprocket-chain 23 that actuates the drive of the slat-conveyer in the scalding-tub. This chain 23 is tensioned by the adjustable idle sprocket 77 mounted on the adjacent rear end of framework 31.

I have hereinabove described one form of construction in which my invention is embodied but it may also be embodied in other forms of construction within the terms of the claims hereinafter made.

What I claim as my invention, and desire to secure by Letters Patent, is:—

1. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, which are disposed in a segment-formed group concave to the beater shaft, and whose respective axes of rotation are substantially parallel to the aforesaid beater-shaft and extend in the direction in which the carcass is advanced; substantially as specified.

2. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers; disposed in a segment-formed group concave to the beater shaft; and said beater-shaft being disposed in a position substantially horizontal and paralleling the face of said conveyer-mechanism upon which such carcass is so rolled, and extending in the direction in which the carcass is advanced; substantially as specified.

3. In a hog-dehairing machine, in combination: a power-driven rotating shaft having beaters borne thereon; and coöperatively power-driven and spirally-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, which are disposed in a segment-formed group concave to the beater shaft, and whose respective axes of rotation are substantially parallel to the aforesaid beater-shaft and extend in the direction in which the carcass is advanced; substantially as specified.

4. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer mechanism including a plurality of mutually parallel and similarly rotating conveyer-rollers whose respective axes of rotation are substantially parallel to the aforesaid beater-shaft and extend in the direction in which the carcass is advanced, said gang of rollers being disposed in a segment-formed group whose angular center is substantially to one side of a plane projected downward from the axis of rotation of the beater-shaft; substantially as specified.

5. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers whose respective axes of rotation are substantially parallel to the aforesaid beater-shaft and extend in the direction in which the carcass is advanced, said gang of rollers being disposed in a segment-formed group whose angular center is advanced, in the direction of the sweep of the beaters, substantially forward of a plane projecting downward from the axis of rotation of the beater-shaft; substantially as specified.

6. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, the outer ones of said gang of rollers having smooth peripheries, and the inner ones having spirally ribbed peripheries; substantially as specified.

7. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, an outer one of said gang of rollers having a smooth periphery, and others having spirally ribbed peripheries; substantially as specified.

8. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, which are disposed in a segment-formed group concave to the beater shaft, and whose respective axes of rotation are substantially parallel to the aforesaid beater-shaft and extend in the direction in which the carcass is advanced; said power-drive connections being so disposed that the sweep of the beaters is in an angular direction reverse to that of the rotarily-moving conveyer-mechanism face upon which the carcass is so rolled, whereby the carcass is rolled over and over by the conjoint action of the beaters and the conveyer-rollers; substantially as specified.

9. In a hog-dehairing machine, in combination: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers that are disposed in a segment-formed group concave to the beater shaft and that have spirally ribbed peripheries, the ribbing being adapted both to advance the carcass and to have a scraping action as the rolling carcass slips across the exposed edges of the ribs; substantially as specified.

10. In a hog-dehairing machine, in the combination: a power-driven rotating shaft bearing flexibly-mounted scrapers; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing-means; said conveyer-mechanism including a plurality of mutually parallel and similarly rotating conveyer-rollers disposed in a segment-formed group concave to the beater shaft and that conjointly and severally act to so advance said carcass; substantially as specified.

11. In a hog-dehairing machine, in combination: power-driven and rotarily-acting flexible scraper-mechanism; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing-means; said conveyer-mechanism including a plurality of mutually parallel and similarly rotating conveyer-rollers disposed in a segment-formed group concave to the beater shaft and that act conjointly and that severally include spirally-acting means for so advancing said carcass; substantially as specified.

In witness whereof, I hereunto set my hand in the presence of two subscribing witnesses.

ALFRED HANNAFORD.

Witnesses:
 HENRY LOVE CLARKE,
 H. M. MUNDAY.